(12) United States Patent
Pulliam et al.

(10) Patent No.: US 9,919,571 B2
(45) Date of Patent: Mar. 20, 2018

(54) KINGPIN ADAPTER

(71) Applicant: Pulliam Enterprises, Inc., Mishawaka, IN (US)

(72) Inventors: Randall A Pulliam, Mishawaka, IN (US); James M. Karasch, Elkhart, IN (US)

(73) Assignee: Pulliam Enterprises, Inc., Mishawaka, IN (US)

( * ) Notice: Subject to any disclaimer, the term of this patent is extended or adjusted under 35 U.S.C. 154(b) by 0 days.

(21) Appl. No.: 15/291,552

(22) Filed: Oct. 12, 2016

(65) Prior Publication Data

US 2017/0100972 A1  Apr. 13, 2017

Related U.S. Application Data

(60) Provisional application No. 62/240,216, filed on Oct. 12, 2015.

(51) Int. Cl.
| | |
|---|---|
| *B60D 1/01* | (2006.01) |
| *B60D 1/07* | (2006.01) |
| *B60D 1/06* | (2006.01) |
| *B62D 53/08* | (2006.01) |

(52) U.S. Cl.
CPC ............ *B60D 1/075* (2013.01); *B60D 1/015* (2013.01); *B60D 1/06* (2013.01); *B62D 53/0842* (2013.01)

(58) Field of Classification Search
CPC ....................................................... B60D 1/075
See application file for complete search history.

(56) References Cited

U.S. PATENT DOCUMENTS

2017/0267040 A1\* 9/2017 Pulliam .................... B60D 1/07

FOREIGN PATENT DOCUMENTS

DE        102011053861 B3 \*  2/2013   ............. B60D 1/075

\* cited by examiner

*Primary Examiner* — Kevin Hurley
(74) *Attorney, Agent, or Firm* — Botkin & Hall, LLP (57) ABSTRACT

A kingpin adapter is provided having an upper wall and a lower wall that are affixed to each other through side walls. The upper and lower walls have a kingpin aperture and a hitch ball aperture that is spaced from and parallel to the kingpin aperture. The kingpin aperture receives a kingpin and the adapter is affixed to the kingpin using pins that extend through the side walls and extend through a portion of the undercut in the kingpin. The upper wall has jack screws that extend through to contact a skid plate that is affixed to the kingpin. The jack screws affix optional adjustable fences that rotationally constrain the skid plate by contacting lateral edges of it.

16 Claims, 13 Drawing Sheets

KINGPIN ADAPTER

CROSS REFERENCE TO RELATED APPLICATIONS

This application claims the benefit of U.S. Provisional Application No. 62/240,216, filed Oct. 12, 2015, the disclosures of which are hereby incorporated by reference.

BACKGROUND OF THE INVENTION

Traditional kingpin and fifth wheel hitches used on recreational vehicles are similar to those used on tractor trailer combinations and have the same disadvantages. The kingpin must be at a very specific height for its entry into the fifth wheel hitch. Further, the operator of the vehicle must back into the kingpin when it is at its proper height. Performing this task can be nearly impossible in locations other than a large, level, and smooth surface.

Another problem with traditional kingpin and fifth wheel hitches is the constraint of the trailer to rotate in a single plane. In a traditional fifth wheel hitch, the kingpin is locked with a jaw that restrictively limits the out of plane movement with respect to the hitch. While this may work for a tractor trailer combination, it is extremely undesirable for smaller vehicles. Traveling over uneven terrain will necessitate out of plane movement. A previous attempt to provide out of plane movement with a fifth wheel hitch has been to provide a pivot pin below the fifth wheel plate. This allows the entire fifth wheel plate to pivot, but adds significant weight and complexity to the hitch. A more flexible system is needed for an ordinary recreational user that may lack the requisite skill to align a kingpin in a fifth wheel hitch. Further, a device is needed to allow an existing trailer having a kingpin to be adapted to the new flexible system.

SUMMARY OF THE INVENTION

The present disclosure describes an adapter that can be attached to a kingpin trailer and used with a hitch ball receiver. The device is selectively lockable to the kingpin and incorporates jack screws that apply biased pressure against the kingpin. The kingpin is received by a kingpin aperture. Transverse pins lock the device to an undercut groove on the kingpin. A ball shaft has a spherical surface that is sized to mate with a vehicle mounted receiver. The ball shaft has a shaft portion that is held by an adapter with the spherical surface protruding downwardly. The ball and adapter may be integral and permanently affixed to each other. Another aperture holds the ball shaft that is offset from the kingpin. The ball assembly is then received by a vehicle-mounted receiver to mate the kingpin trailer to the hitch on the vehicle. Alignment and anti-rotation walls extend upwardly from the top surface of the adapter.

BRIEF DESCRIPTION OF THE DRAWINGS

A preferred embodiment of this invention has been chosen wherein.

DESCRIPTION OF THE PREFERRED EMBODIMENT

Figure 1:
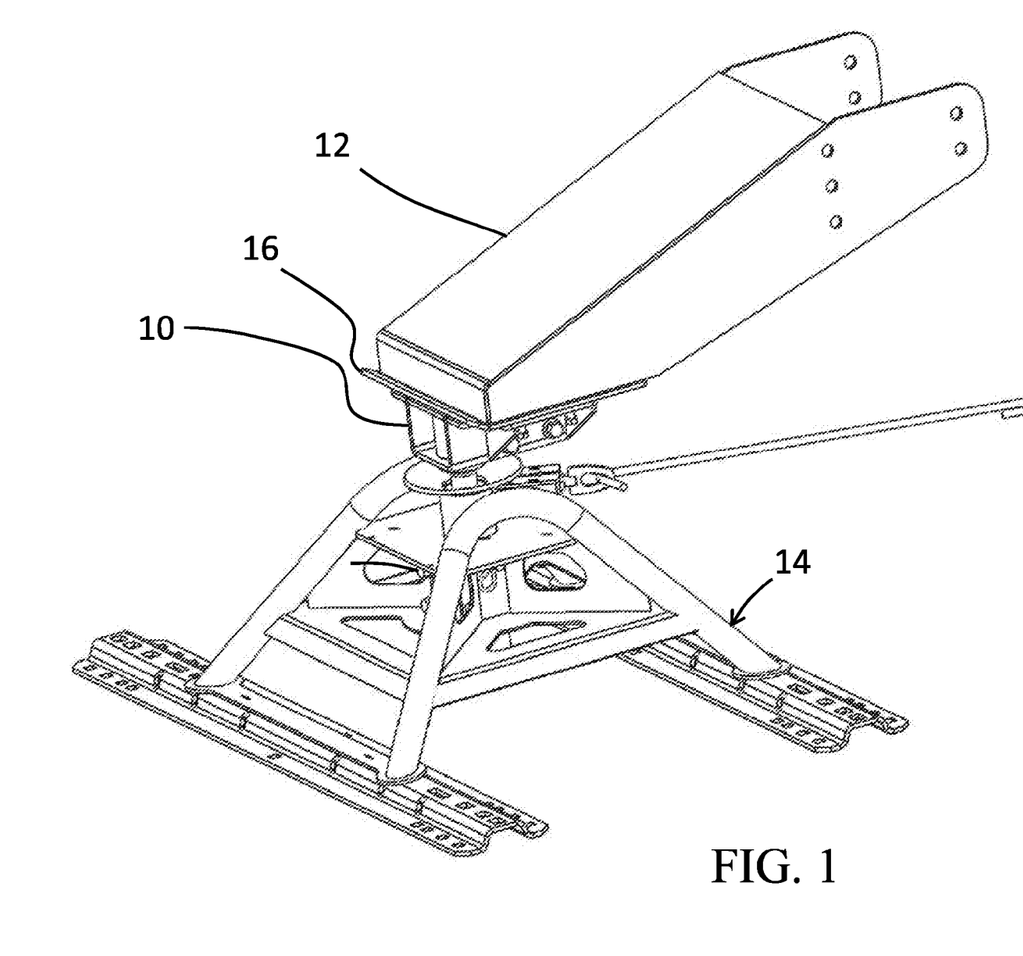
FIG. 1 is a top isometric view of the adapter as affixed to a hitch and kingpin.
Figure 8:
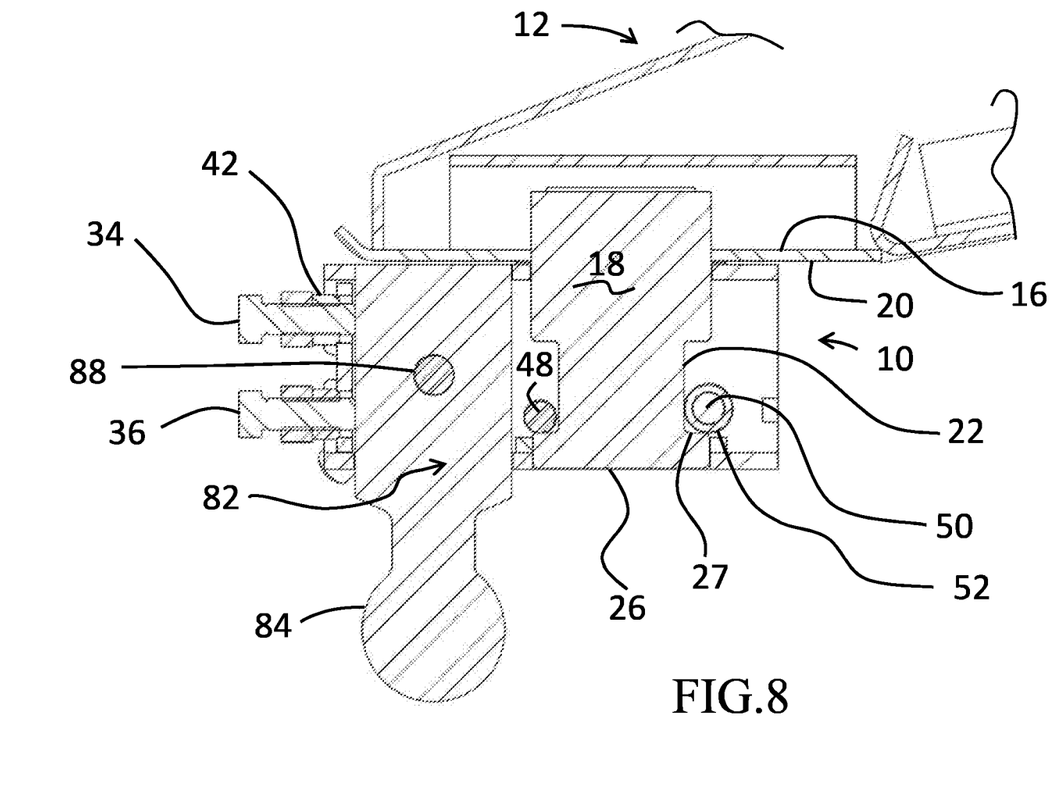
FIG. 8 is a side section view taken about line 6-6 in FIG. 7.
Figure 9:
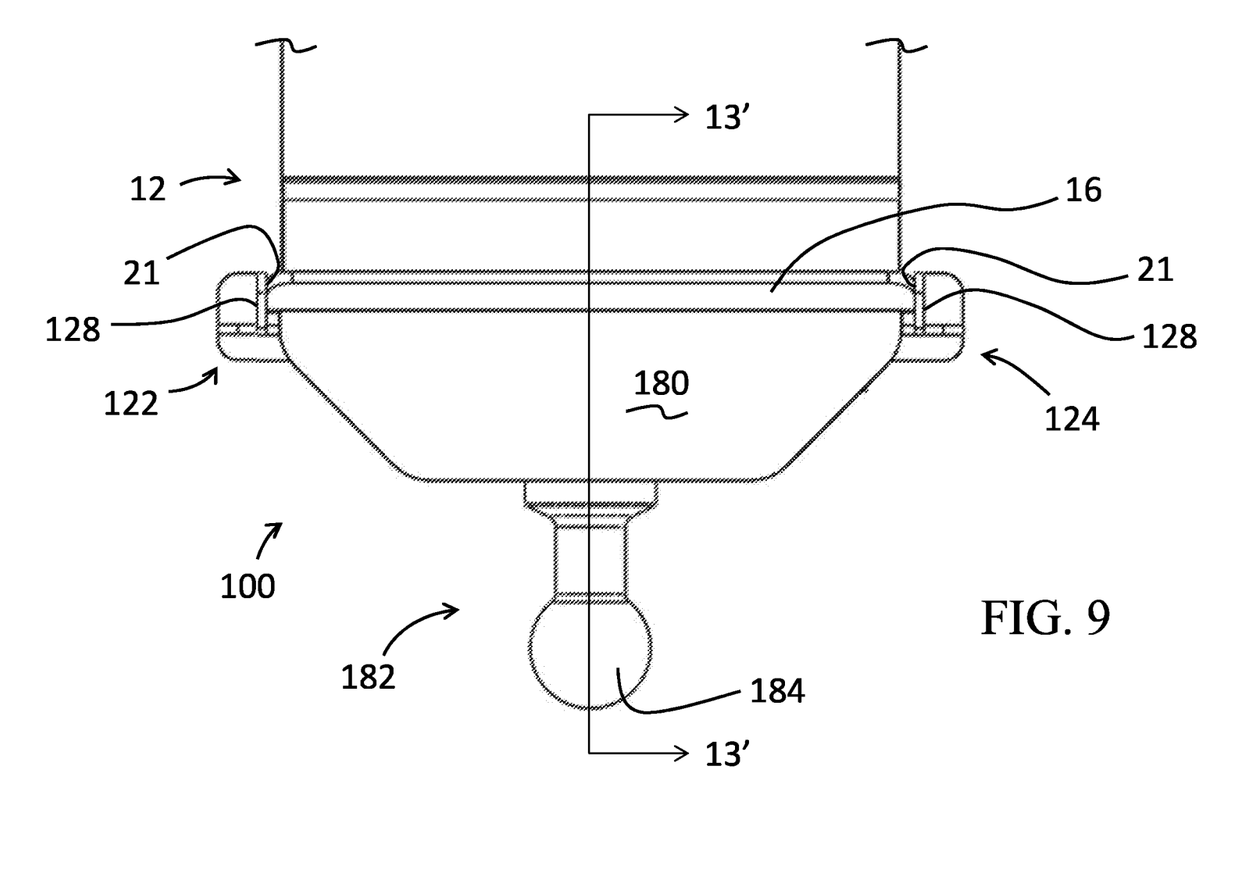
FIG. 9 is a front view of the adapter as affixed to a hitch and kingpin.
Figure 10:
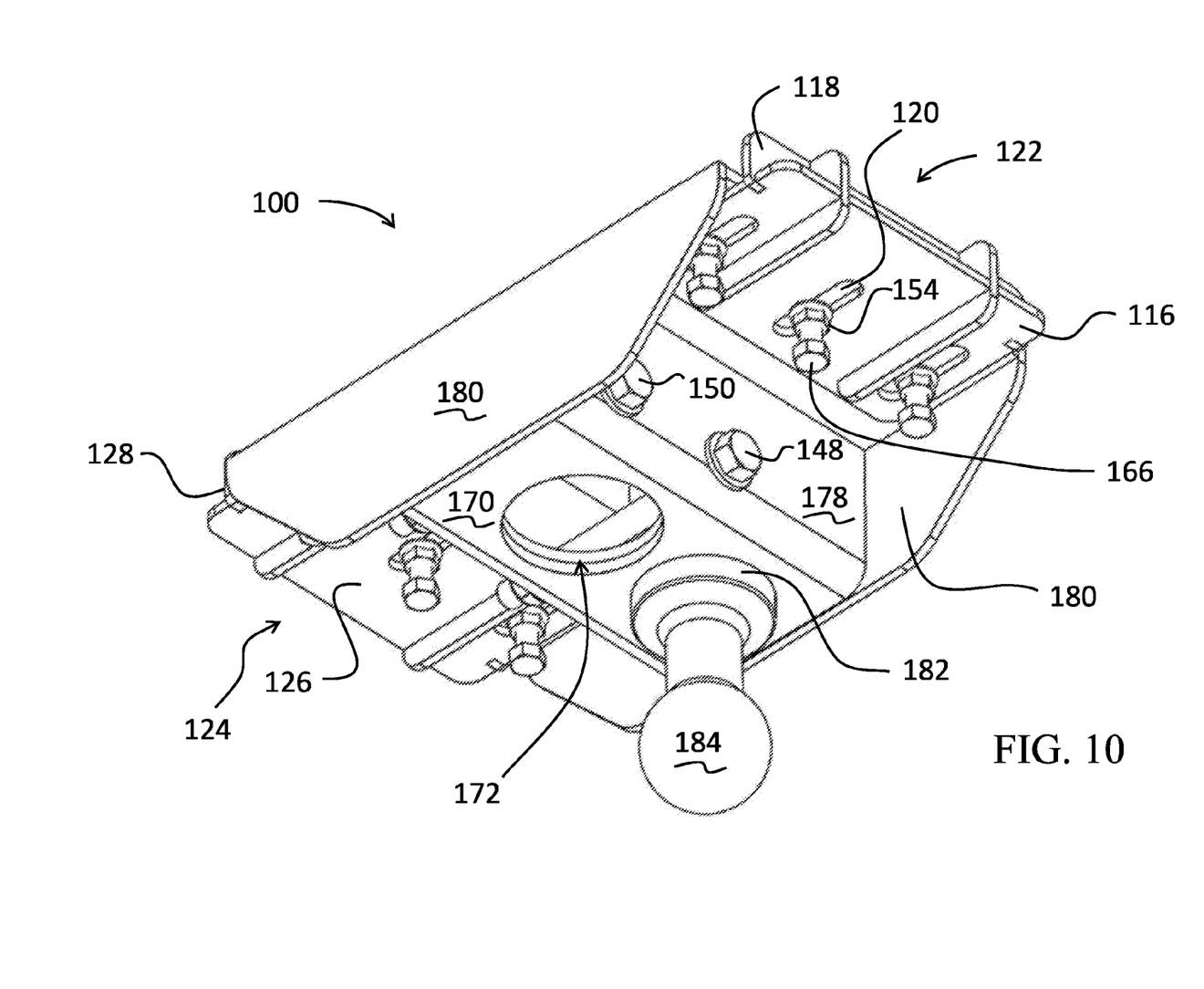
FIG. 10 is a bottom isometric view of the adapter shown in FIG. 9.
Figure 11:
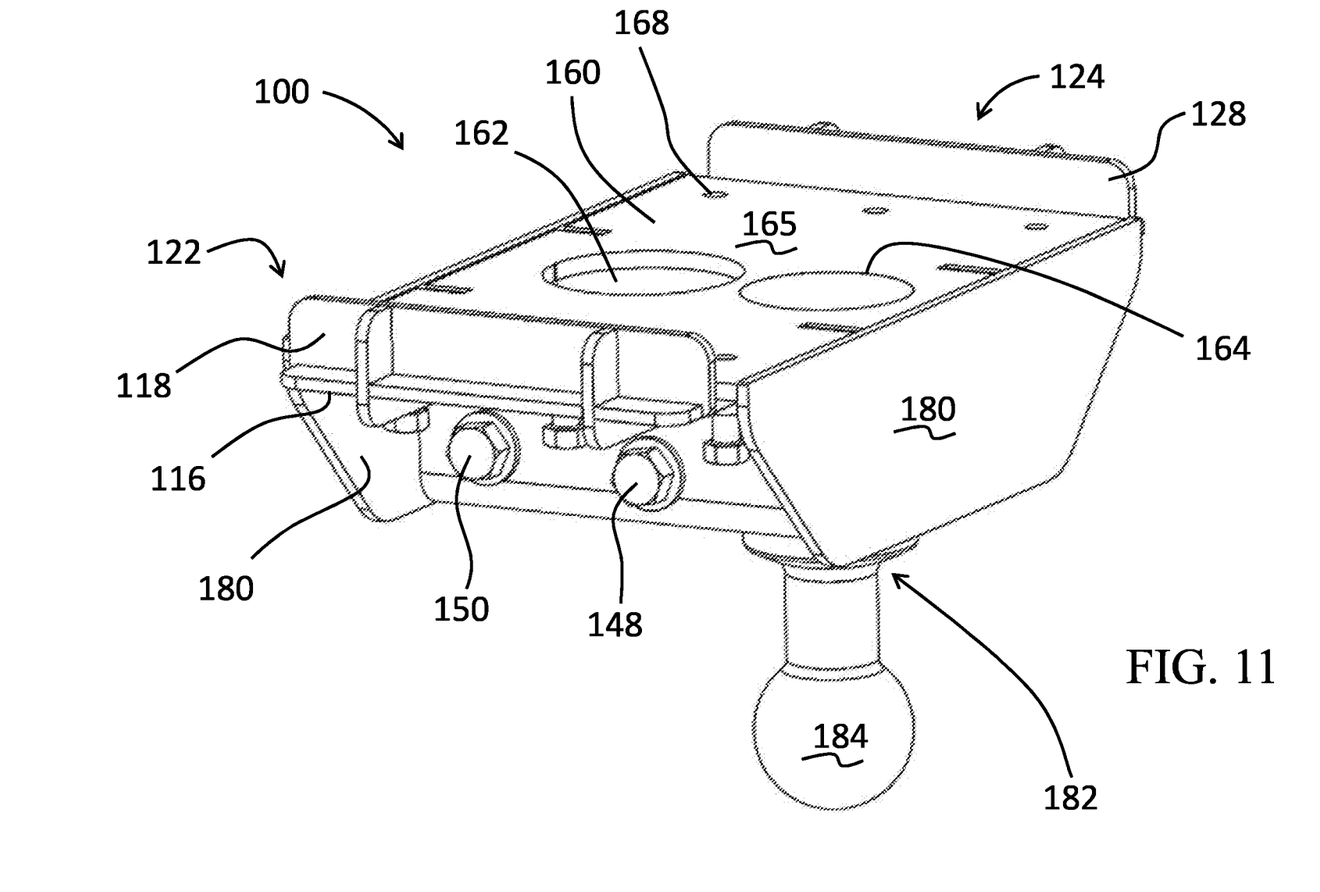
FIG. 11 is a top isometric view of the adapter shown in FIGS. 9-10.
Figure 12:
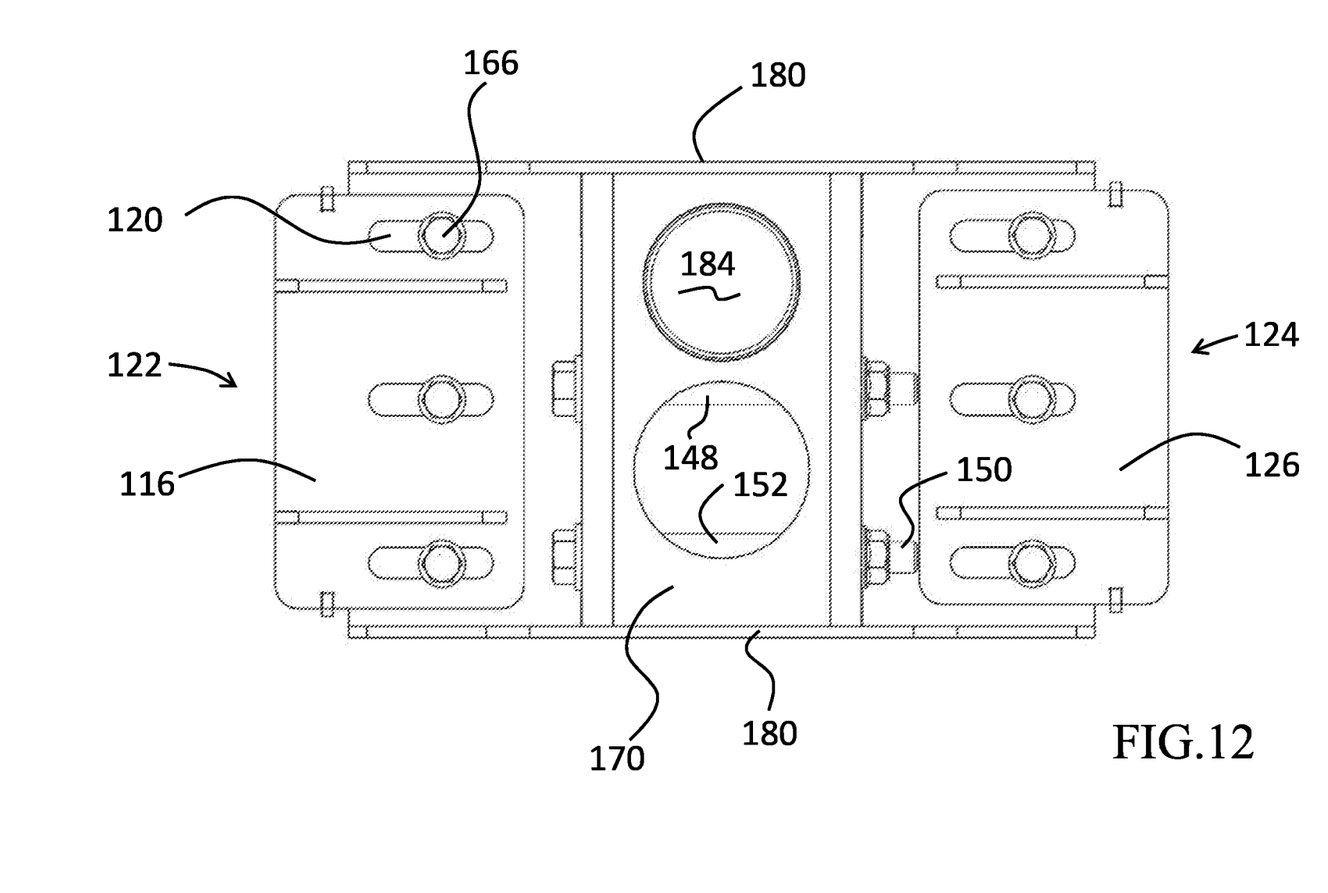
FIG. 12 is a bottom view of the adapter shown in FIGS. 9-11.
Figure 13:
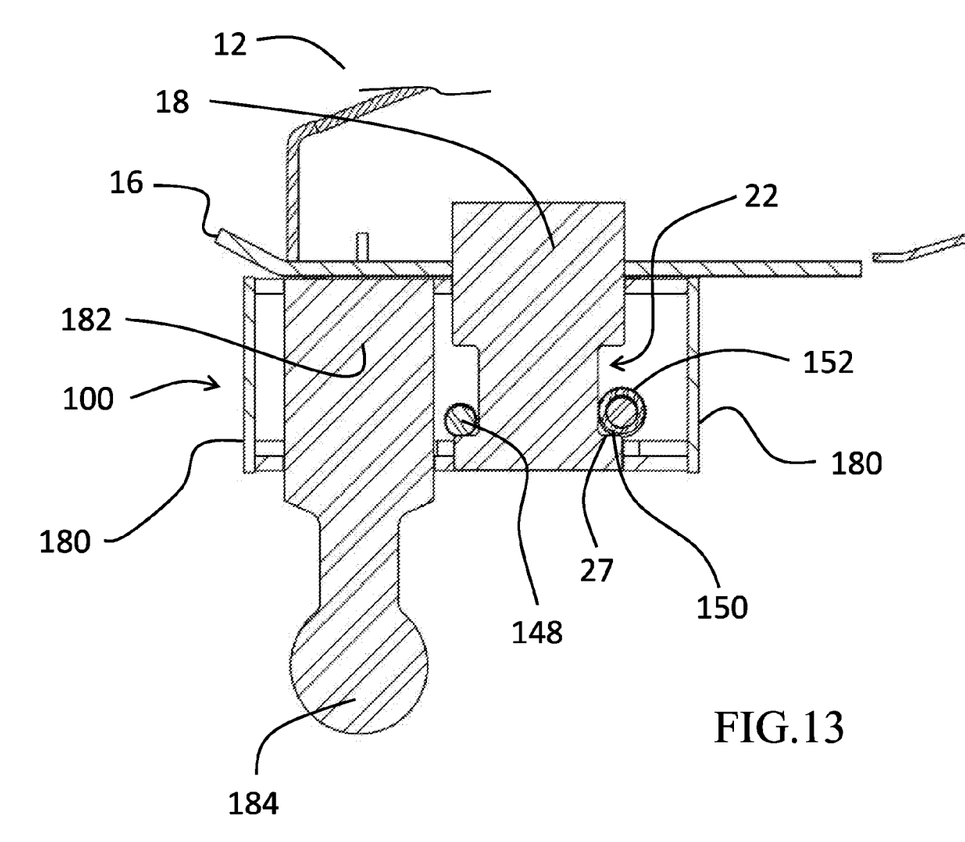
FIG. 13 is a side section view taken about line 13-13 in FIG. 9.

FIG. 1 shows a truck/trailer attachment mechanism. The entire trailer is not shown, but is commonly an RV, utility trailer, or other tow-behind trailer. The common method of towing a trailer is a fifth-wheel attachment. Compared to a bumper-mounted hitch, it offers more stability, better towing, and has a superior connection between the trailer and the towing vehicle. This stability arises from the location of the trailer tongue weight being over the rear axle. The adapter 10 described herein is designed to attach between the trailer's pin box 12 and a bed-mounted hitch 14. The purpose of the adapter 10 is to convert a standard kingpin 18 as shown in FIG. 8 to a downwardly protruding hitch ball 84 that serves as a more effective coupler than a standard kingpin 18. The trailer has a pin box 12 with a kingpin 18 that extends downwardly from a skid plate 16. The kingpin 18 is securely affixed to the trailer and is commonly used to attach the RV to a towing vehicle. A bed-mounted hitch 14 has a receiver 15 that affixes to the towing vehicle, usually a truck.

The pin box 12, skid plate 16, and kingpin 18 are normally affixed to the trailer through welding, bolts, rivets, or other mechanical fastening. The skid plate 16 has a lower surface 20 that is typically flat where the kingpin 18 protrudes. The lower surface 20 has lateral edges 21 that define the width of the skid plate 16. As shown in FIG. 8, the kingpin 18 is affixed to the skid plate 16 and is cylindrically shaped with a major diameter 24. An undercut 22 with a minor diameter 25 is located near the terminal end 26. The undercut 22 ends at a shoulder surface 27 that is nearest the terminal end 26. A small portion of the major diameter 24 remains below the undercut 22.

FIG. 1 shows the context and environment of a bed-mounted hitch 14, for use with the hitch ball 84 of the adapter 10. The bed-mounted hitch 14 has a receiver tube with a lead-in funnel that is for guiding a hitch ball 84 into the receiver tube, where it can be affixed to the hitch 14.

The adapter 10 is shown by itself in FIGS. 3-6. The top wall 60 is typically made from and shown as a piece of flat sheet metal that has a kingpin aperture 62 and a hitch ball aperture 64. As shown, both apertures 62, 64 are circular, but other shapes are possible. The top wall 60 has a series of jack screws 66 that are threaded into the top wall 60 in tapped holes 68. The jack screws 66, when tightened, protrude above the uppermost surface 65 of the top wall 60. Jamb nuts 54 lock the jack screws 66 in place.

Figure 3:
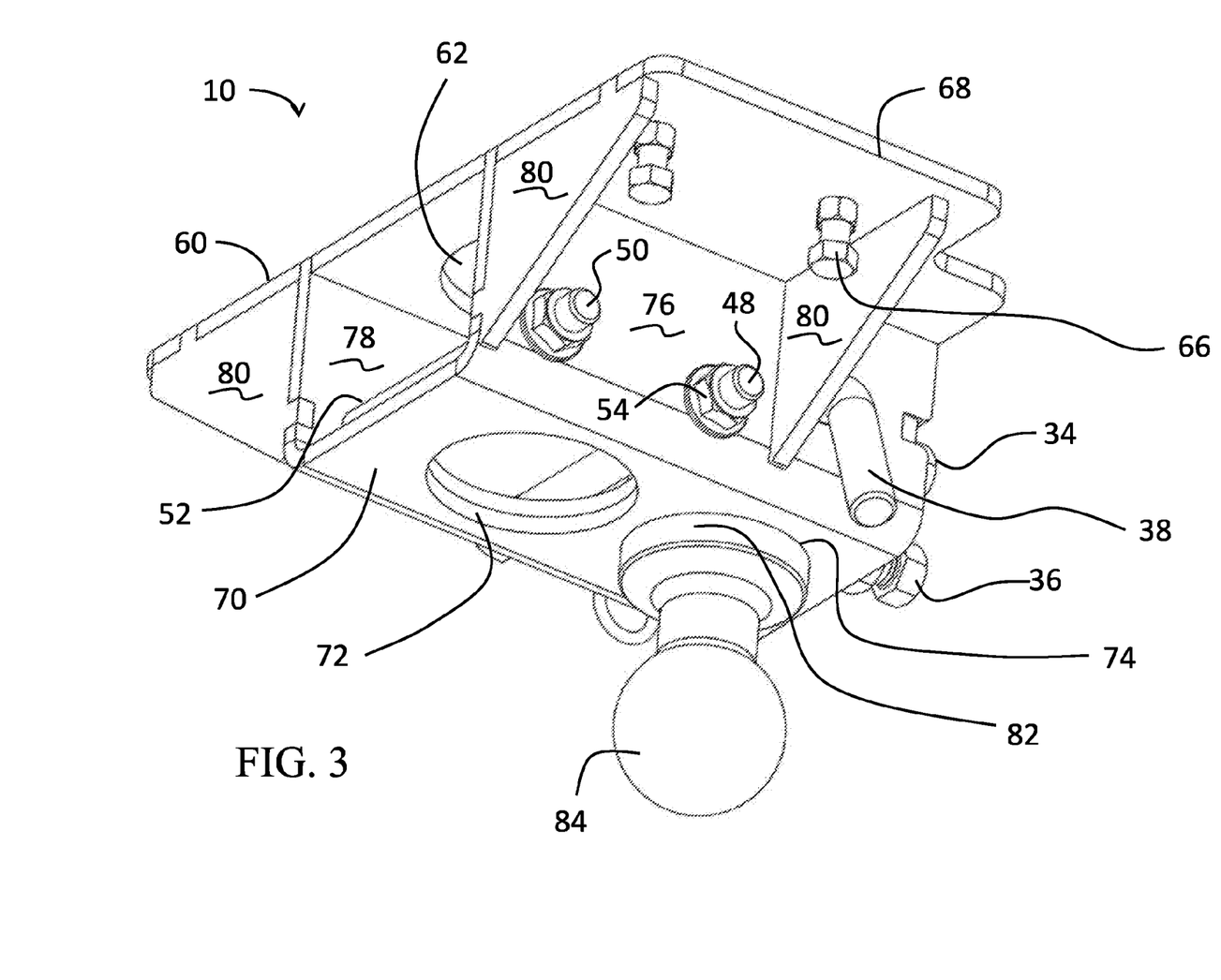
FIG. 3 is a bottom isometric view of the adapter shown in FIG. 1-2.
Figure 4:
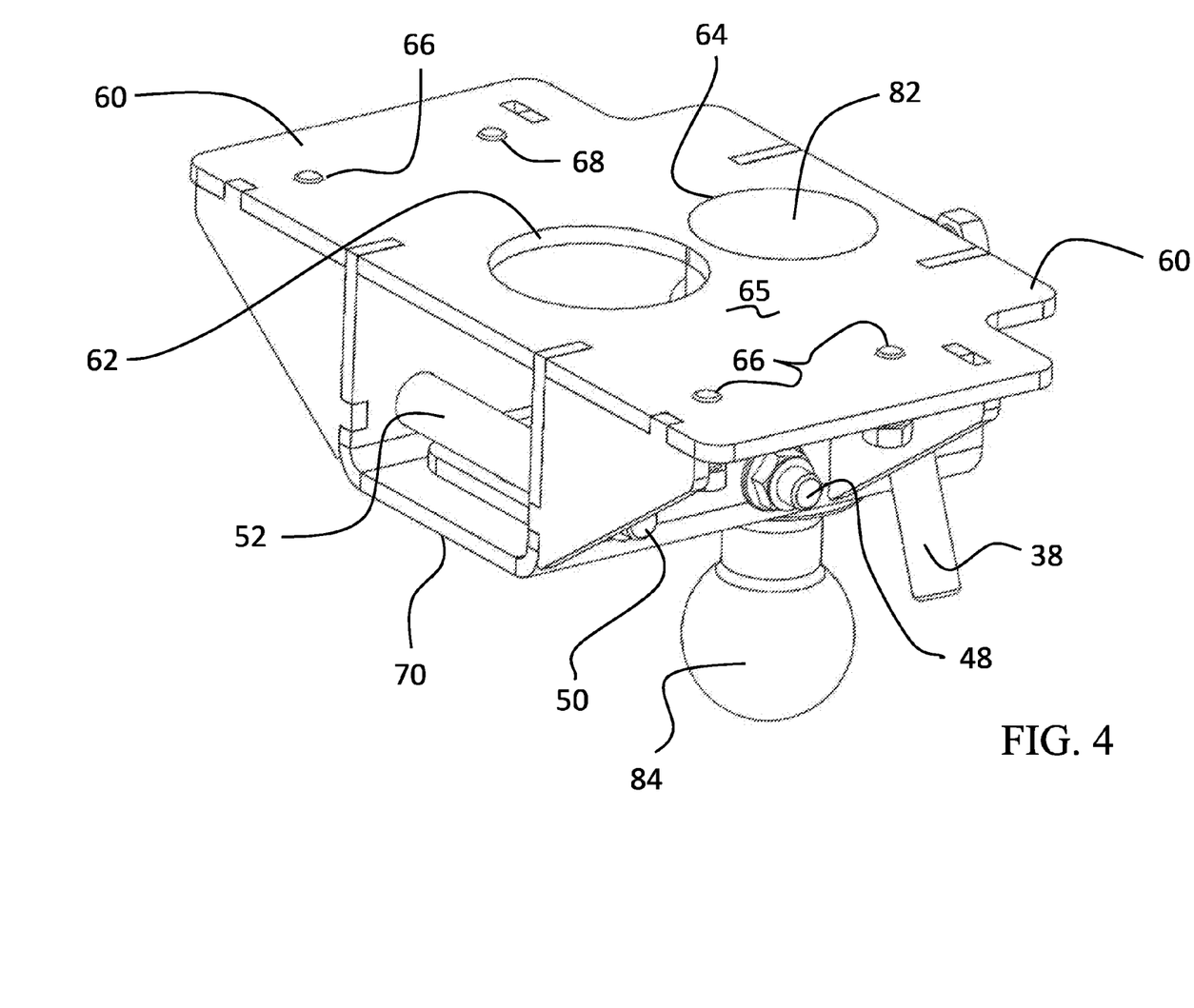
FIG. 4 is a top isometric view of the adapter shown in FIGS. 1-3.
Figure 5:
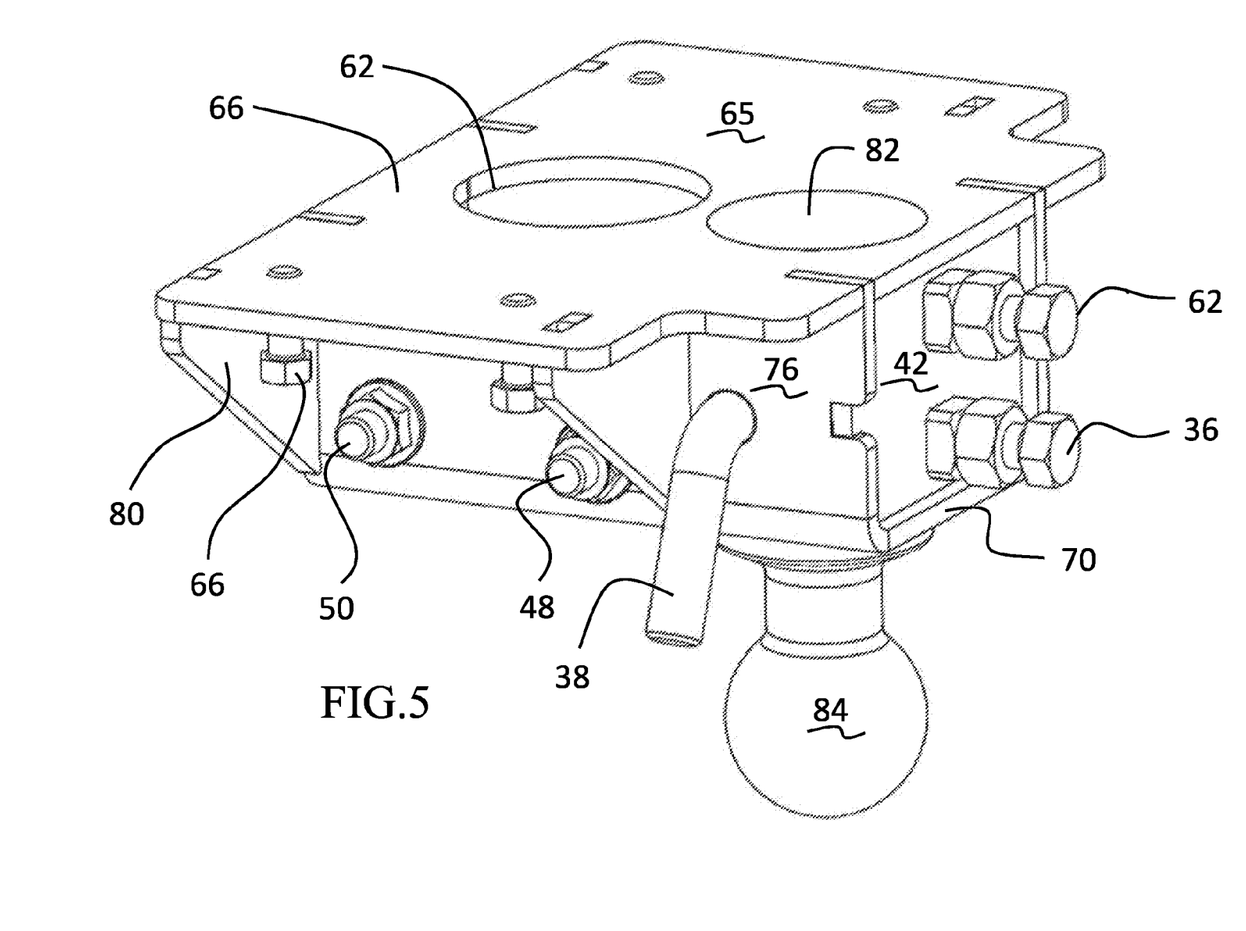
FIG. 5 is a top isometric view of the adapter shown in FIGS. 1-4.
Figure 6:
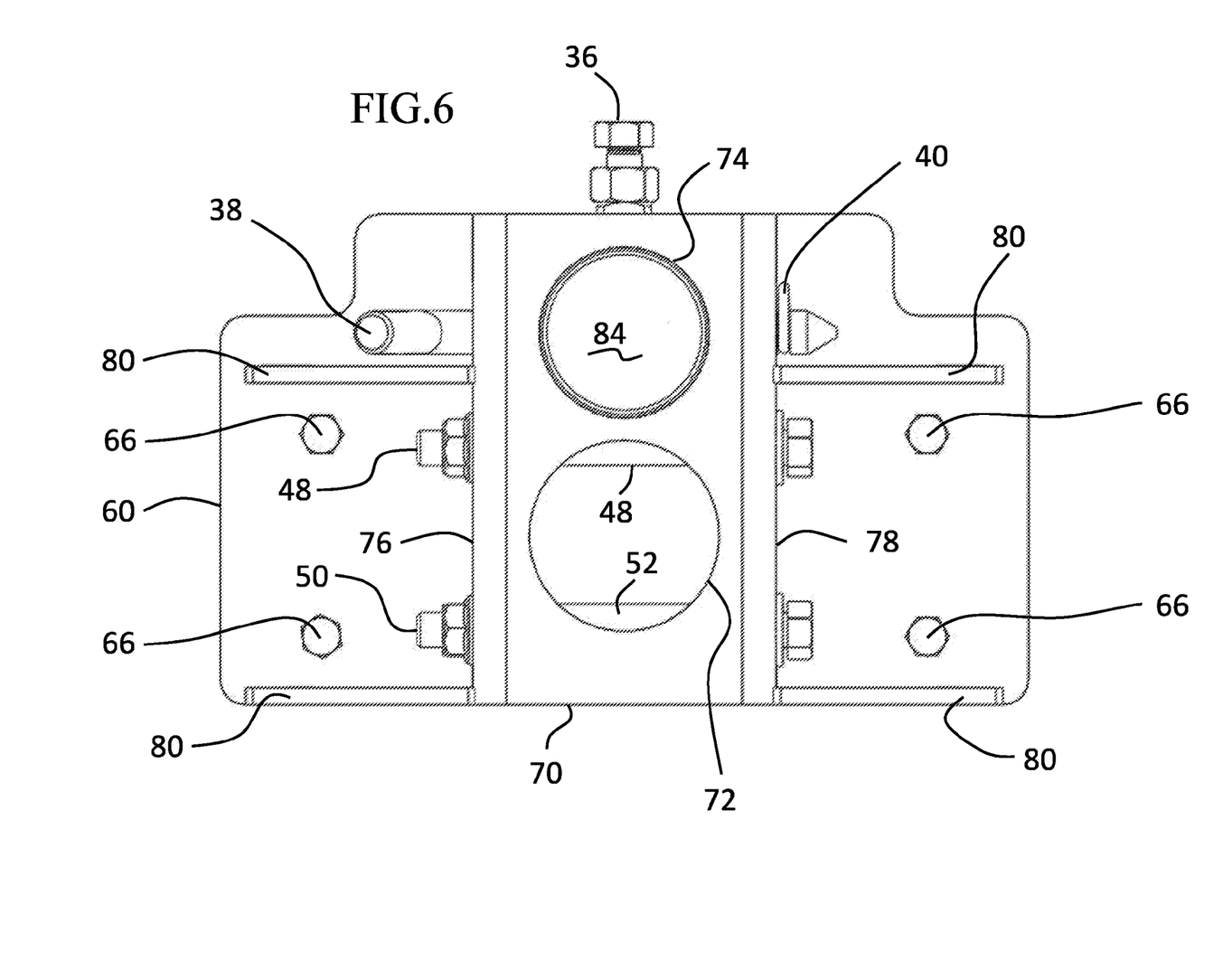
FIG. 6 is a bottom view of the adapter shown in FIGS. 1-5.
Figure 7:
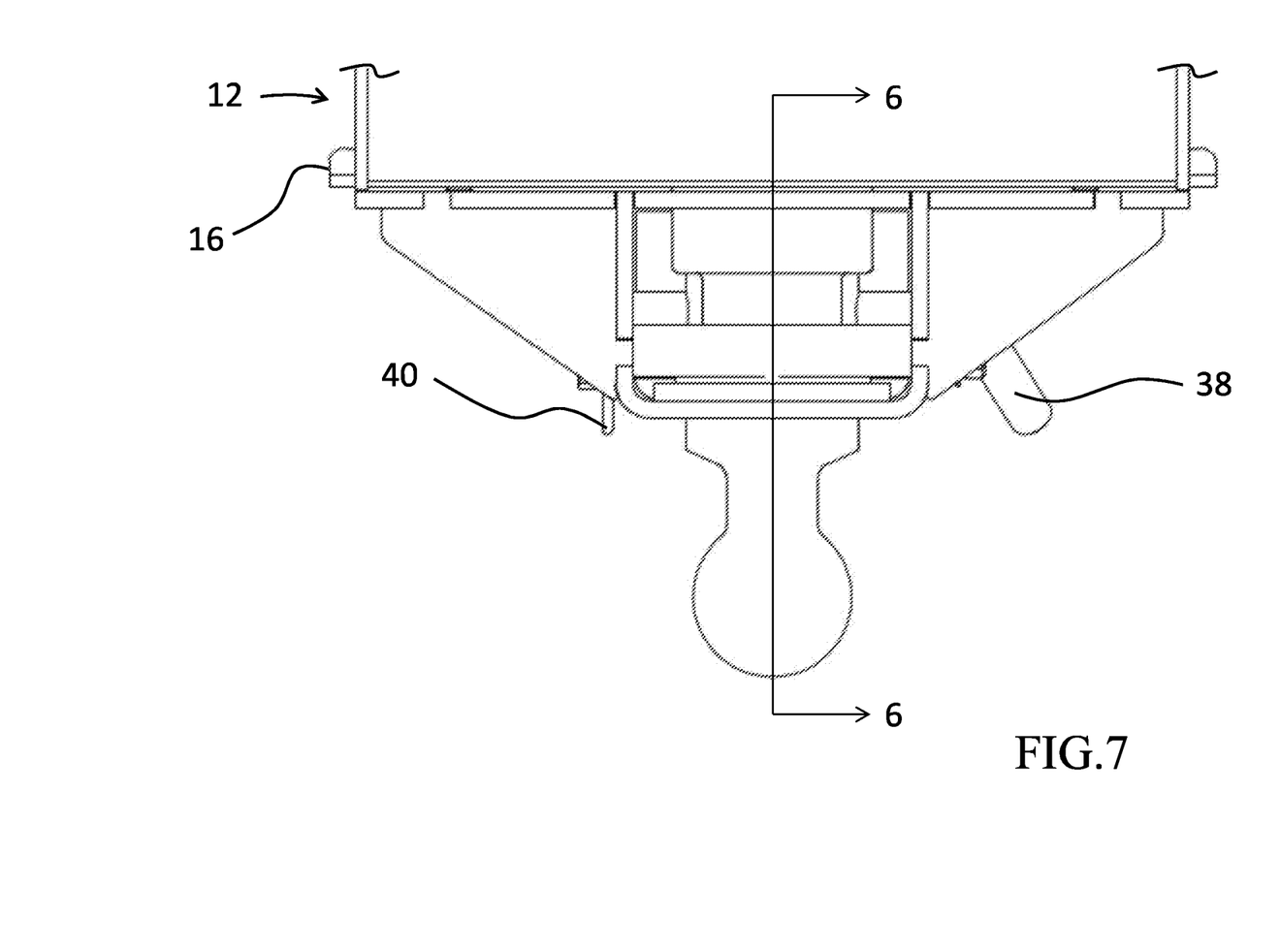
FIG. 7 is a rear view of the adapter shown in FIGS. 1-6 as affixed to a kingpin.

The adapter 10 has a bottom wall 70 with a kingpin aperture 72 and a hitch ball aperture 74. As shown in FIG. 3, the coaxial alignment of the kingpin apertures 62, 72 define a cylindrical projection through the adapter 10. As shown, both apertures 72, 74 are circular but other shapes are possible. The coaxial alignment of the hitch ball apertures 64 and 74 define a projection through the adapter 10 that is spaced from and parallel to the cylindrical projection from kingpin apertures 62 and 72. Extending between the top wall 60 and the bottom wall 70 are side walls 76, 78 that set the parallel spacing between the top wall 60 and the bottom wall 70. Reinforcing gussets 80 reinforce the side walls 76, 78 and the top wall 60. As shown, the side walls 76, 78 and bottom wall 70 are formed from the same flat sheet metal, but it is contemplated that these are separate pieces. The side walls 76, 78 have opposing hitch ball locking holes that align with a transverse hole when a hitch shaft 82 is located in the hitch ball apertures 64, 74.

Figure 2:
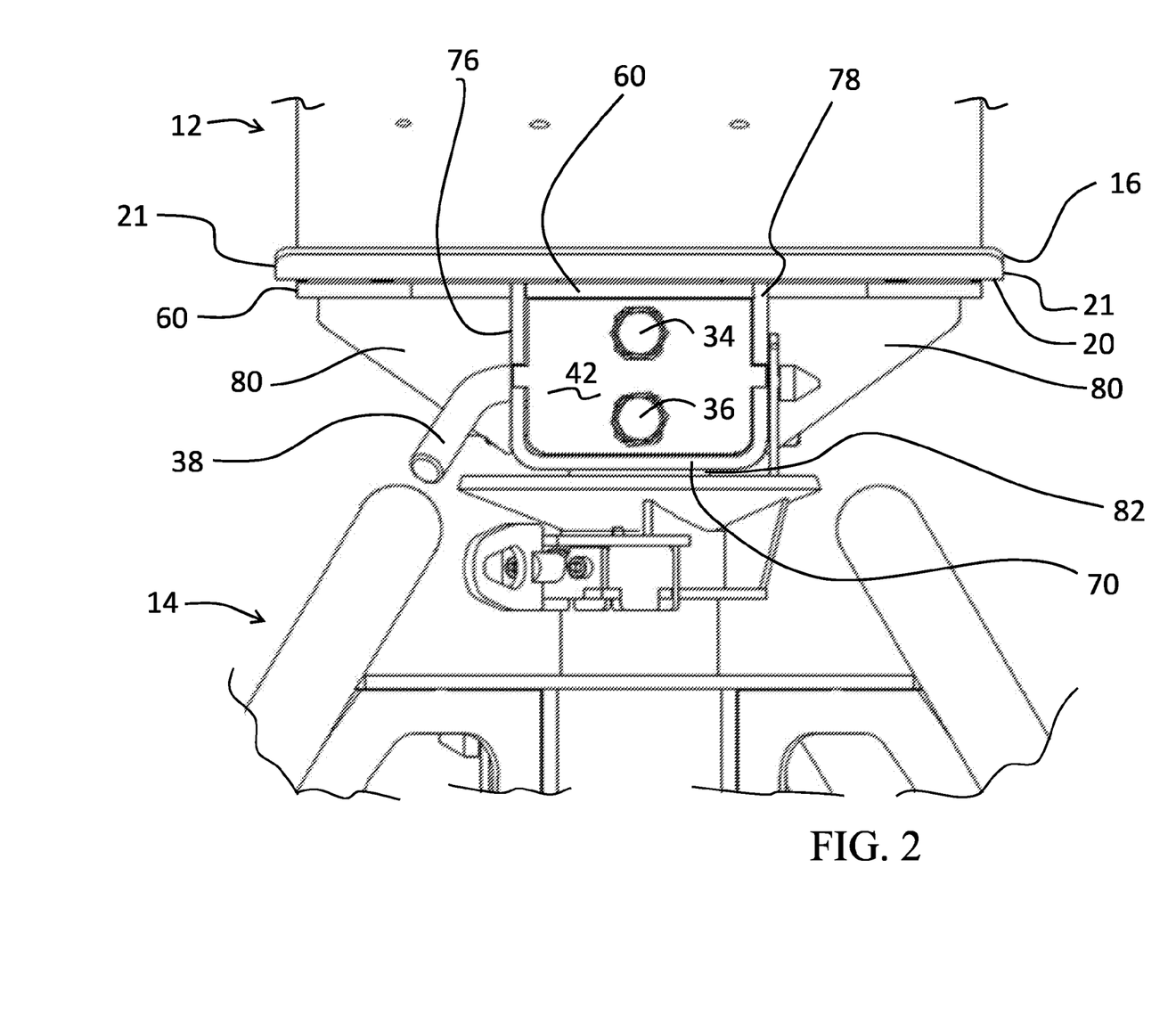
FIG. 2 is a front view of the adapter shown in FIG. 1 as affixed to a hitch and kingpin.

The hitch shaft 82 has a ball portion 84 that extends downwardly from it. Extending through the diameter of the hitch shaft 82 is a transverse hole 88. The transverse hole 88 is adapted to receive a pin 38 as shown in FIG. 2 that extends through the side walls 76, 78 at hitch ball locking holes. The pin 38 is bent downwardly at one end and cannot be passed through its corresponding locking holes. The opposite end of the pin 38 receives a clip 40 that holds the pin 38 in the transverse hole and locking holes on the side walls 76, 78. It is contemplated that the clip 40 could be replaced with an E-clip, snap ring, or other mechanical fastening device. Once the pin 38 is in place and securely locking the hitch shaft 82 to the adapter 10, jack screws 34, 36 can be tightened against the hitch shaft 82. This prevents the hitch shaft 82 from rattling or being loose. The jack screws 34, 36 are supported by an end wall 42. It is contemplated that the hitch shaft 82 may be permanently affixed to the adapter 10 by welding or otherwise affixing it to the adapter 10. The end wall 42 rigidifies and bridges the side walls 76, 78 to the top and bottom walls 60, 70.

As is shown in FIG. 8, the kingpin 18 is received by the kingpin apertures 62, 72 in the top and bottom walls 60, 70 and is retained by a first locking pin 48 and a second locking pin 50. As shown, the second locking pin 50 has a sleeve 52. The sleeve 52 provides reinforcement and strengthening of the second locking pin 50. The first locking pin 48 passes through holes in the side walls 76, 78. The side walls 76, 78 and the second locking pin 50 passes through holes in the side walls 76, 78. The holes are located adjacent to the undercut 22 such that the locking pins 48 and 50 intersect the cylindrical kingpin aperture created by apertures 62, 72 and fit into the undercut 22 and lock the kingpin 18 from being removed from the kingpin apertures 62, 72. The locking pins 48, 50 are shown as bolts but a smooth pin similar to pin 38 (shown in FIG. 3) is contemplated. Because the kingpin 18 and undercut 22 shown in FIG. 8 may not perfectly align with the outside diameters of the locking pins 48, 50, the jack screws 66 can be tightened to contact the lower surface of the skid plate 20 and bias the kingpin 18 away from the adapter 10, and therefore firmly contact the edge of the undercut 22 against the outside diameters of the pins 48, 50. This prevents the adapter 10 from rotating with respect to the pin box 12 as shown in FIGS. 1, 2, and 8.

To install the adapter 10 onto an existing kingpin 18 and pin box 12, the following steps are performed. First, the jack screws 66 are retracted sufficiently to be near or below the upper surface of the top wall 60. Next, the pins 48, 50, and the sleeve 52 are removed. This allows a clear opening for the terminal end 26 of the kingpin 18 to be passed through both the kingpin apertures 62 and 72. Once the undercut 22 is lined up with the holes as shown in FIG. 1, the first locking pin 48 can be inserted and secured. Also, the sleeve 52 can be inserted between the walls 76, 78 and the second locking pin 50 can be passed through the center of it. At that point, the jack screws 66 can be tightened against the skid plate 16, specifically the lower surface 20. The jamb nuts 54 are then tightened. This secures the adapter 10 to the trailer. Removal is the reverse of installation. The user may exchange different sized balls if needed. If the user desires to remove the hitch shaft 82, the jack screws 34, 36 are loosened sufficiently to no longer apply biased pressure against the major diameter 24. The pin 38 is then removed by first removing the clip 40 and sliding the pin 38 out through the transverse holes. To insert a new hitch shaft 82, the user reverses the steps of removal.

The adapter 100 may incorporate adjustable fences 122, 124 as shown in FIGS. 9-13. The adjustable fences 122, 124 prevent rotation of the adapter 100 in the event that the jack screws 166 are not properly tightened against the skid plate 16. The embodiment of the adapter 100 is shown in FIGS. 10-13 and includes the same top wall 160, bottom wall 170, and hitch shaft 182. The top wall 160 is typically made from and shown as a piece of flat sheet metal that has a kingpin aperture 162 and a hitch ball aperture 164. As shown, both apertures 162, 164 are circular, but other shapes are possible. The top wall 160 has a series of jack screws 166 that are threaded into the top wall 160 in tapped holes 168. When the jack screws 166 and jamb nuts 154 are tightened, the adjustable fences 122, 124 are secured and the jack screws 166 also protrude above the uppermost surface 165 of the top wall 160. To prevent rotation, the adjustable fences 122, 124 are adjusted to come into contact with the lateral edges 21 of the skid plate 16 before the jamb nuts 154 are tightened. The adjustable fences 122, 124 are formed from a slotted wall portion 116, 126 that are affixed to a corresponding vertical wall portion 118, 128. The slotted wall portions 116, 126 have a series of slots 120 that allow the adjustable fences 122, 124 to adjust. It is contemplated that the adjustable fences 122, 124 may be fixed to the top wall through other fasteners separate from the jack screws 166 and jamb nuts 154.

The adapter 100 has a bottom wall 170 with a kingpin aperture 172 and a hitch ball aperture 174. The coaxial alignment of the kingpin apertures 162 and 172 define a cylindrical projection through the adapter 100. As shown, both apertures 172, 174 are circular but other shapes are possible. The coaxial alignment of the hitch ball apertures 164 and 174 define a projection through the adapter 10 that is spaced from and parallel to the cylindrical projection from kingpin apertures 162 and 172. It is contemplated that hitch ball apertures 164 and 174 could be a shape other than circular. Extending between the top wall 160 and the bottom wall 170 are side walls 176, 178 that set the parallel spacing between the top wall 160 and the bottom wall 170. Reinforcing end walls 180 reinforce the side walls 176, 178 and the top wall 160. As shown, the side walls 176, 178 and bottom wall 170 are formed from the same flat sheet metal, but it is contemplated that these are separate pieces.

The hitch shaft 182 has a ball portion 184 that extends downwardly from it. The hitch shaft, as shown, is permanently affixed to the adapter 100 by welding or other permanent fixation method. The end walls 180 rigidify and bridge the side walls 176, 178 and the top and bottom walls 160, 170.

The kingpin 18 is received by the kingpin apertures 162, 172 in the top and bottom walls 160, 170 and is retained by a first locking pin 148 and a second locking pin 150. As shown, the second locking pin 150 has a sleeve 152. The sleeve 152 provides reinforcement and strengthening of the second locking pin 150. The first locking pin 148 passes through holes in the side walls 176, 178. The side walls 176, 178 and the second locking pin 150 passes through holes in the side walls 176, 178. The holes are located adjacent to the undercut 22 such that the locking pins 148 and 150 intersect the cylindrical kingpin aperture created by apertures 162, 172 and fit into the undercut 122 and lock the kingpin 18 from being removed from the kingpin apertures 162, 172. The locking pins 148, 150 are shown as bolts but a smooth pin similar to pin 38 (shown in FIG. 3) is contemplated. Because the kingpin 18 and undercut 22 shown in FIG. 13 cannot perfectly align with the outside diameters of the locking pins 148, 150, the jack screws 166 can be tightened to contact the lower surface 20 and bias the kingpin 18 away from the adapter 100, and therefore firmly contact the edge of the undercut 22 against the outside diameters of the locking pins 148, 150. This prevents the adapter 100 from rotating with respect to the pin box 12.

To install the adapter 100 onto an existing kingpin 18 and pin box 12, the following steps are performed. First, the jack screws 166 are retracted sufficiently to be near or below the upper surface of the top wall 160. Next, the locking pins 148, 150, and the sleeve 152 are removed. This allows a clear opening for the terminal end 26 of the kingpin 18 to be passed through both the kingpin apertures 162 and 172. Once the undercut 22 is lined up with the holes as shown in FIG. 1, the pin 148 can be inserted and secured. Also, the sleeve 152 can be inserted between the walls 176, 178 and the locking pin 150 can be passed through the center of it. At that point, the adjustable fences 122, 124 are brought into contact with the lateral edges 21 of the skid plate 16. Once the adjustable fences 122, 124 are in position, the jack screws 166 can be tightened against the skid plate 16, specifically the lower surface 20. Lastly, the jamb nuts 154 are tightened. This secures the adapter 100 to the trailer. Removal is the reverse of installation.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed:

1. A kingpin adapter adapted to be affixed to a trailer having a pin box with a kingpin extending downwardly from a skid plate having lateral edges and being affixed to said pin box, said kingpin having a major diameter and an undercut located near a distal end defining a shoulder surface near said distal end, said adapter comprising:
    a main body having an upper wall having an upper surface and a substantially parallel lower wall fixed with respect to said upper wall, a substantially cylindrical kingpin aperture extending through said upper and lower wall, said kingpin aperture being substantially perpendicular to said upper and lower walls and adapted to receive said kingpin;
    a shaft aperture extending through said upper and lower walls and being offset from and parallel to said kingpin aperture;
    a hitch shaft having a ball portion extending therefrom, said ball portion having a substantially spherical shaped surface, said hitch shaft being connected to said main body through said shaft aperture;
    a first locking pin extending through said main body between said upper and lower wall and adapted to abut said kingpin on one side of said undercut, a second locking pin extending through said main body between said upper and lower wall and adapted to axially abut said kingpin on another side of said undercut, said first and second locking pins being spaced apart nearer than said major diameter to locate and retain said kingpin within said kingpin aperture;
    said upper wall having jack screws threadably received in said upper wall and adapted to extend beyond said upper surface of said upper wall; and
    a fence extending perpendicularly to said upper surface of said upper wall adapted for contacting a lateral edge of said skid plate, fence having a slotted wall portion affixed to a corresponding vertical wall portion, said slotted wall portion having an elongate aperture adapted to receive said jack screws.

2. The adapter of claim 1, wherein said fence is adjustable with respect to said upper wall and selectively lockable with respect to said upper wall.

3. The adapter of claim 2, wherein said fence includes a slot in which said jack screw slidingly engages said slot to guide said fence, said jack screw including a jamb nut for selectively locking said fence with respect to said upper wall.

4. The adapter of claim 1, said hitch shaft being removably mated to said main body, said hitch shaft having a locking aperture extending transversely therethrough, a pin locking said hitch shaft through sidewalls connecting said upper and lower walls.

5. A kingpin adapter adapted for use with a trailer having a pin box with a kingpin extending downwardly from a skid plate having lateral edges and being affixed to said pin box, said kingpin having a major diameter and an undercut located near a distal end defining a shoulder surface near said distal end, said adapter comprising:
    a main body having an upper wall having an upper surface and a substantially parallel lower wall fixed with respect to said upper wall, a substantially cylindrical kingpin aperture extending through said upper and lower wall, said kingpin aperture being substantially perpendicular to said upper and lower walls and adapted to receive said kingpin;
    a shaft aperture extending through said upper and lower walls and being offset from and parallel to said kingpin aperture;
    a hitch shaft having a ball portion extending outwardly therefrom, said ball portion having a substantially spherical shaped surface, said hitch shaft being affixed through said shaft aperture; and
    a first locking pin extending through said main body between said upper and lower wall and adapted to abut said kingpin on one side of said undercut, a second locking pin extending through said main body between said upper and lower wall and adapted to axially abut said kingpin on another side of said undercut, said first and second locking pins being spaced apart nearer than said major diameter to locate and retain said kingpin within said kingpin aperture.

6. The adapter of claim 5, said upper wall having jack screws threadably received in said upper wall and adapted to extend beyond said upper surface of said upper wall and contact said skid plate.

7. The adapter of claim 5, wherein said upper wall having a movable fence extending perpendicularly to said upper surface of said upper wall adapted for contacting a lateral edge of said skid plate.

8. The adapter of claim 7, wherein said fence having a slotted wall portion affixed to a corresponding vertical wall portion, said slotted wall portion having an elongate aperture adapted to receive a jack screw.

9. The adapter of claim 7, wherein said fence is adjustable with respect to said upper wall and selectively lockable with respect to said upper wall.

10. The adapter of claim 9, wherein said fence includes a slot in which a jack screw slidingly engages said slot to guide said fence, said jack screw including a jamb nut for selectively locking said fence with respect to said upper wall.

11. The adapter of claim 5, said hitch shaft being removably mated to said main body, said hitch shaft having a locking aperture extending transversely therethrough, a pin locking said hitch shaft through sidewalls connecting said upper and lower walls.

12. A kingpin adapter adapted for use with a trailer having a pin box with a kingpin extending downwardly from a skid plate having lateral edges and being affixed to said pin box, said kingpin having a major diameter and an undercut located near a distal end defining a shoulder surface near said distal end, said adapter comprising:
 a main body having an upper wall having an upper surface and a substantially parallel lower wall fixed with respect to said upper wall, a substantially cylindrical kingpin aperture extending through said upper and lower wall, said kingpin aperture being substantially perpendicular to said upper and lower walls and adapted to receive said kingpin, a shaft aperture extending through said upper and lower walls and being offset from and parallel to said kingpin aperture;
 a removable hitch shaft having a ball portion extending from said hitch shaft, said ball portion having a substantially spherical shaped surface extending from said lower wall, said hitch shaft removably mated to said main body, said hitch shaft having a locking aperture extending transversely through said shaft portion;
 a removable ball lock adapted to extend through said locking aperture and said main body; and
 a first locking pin extending through said main body between said upper and lower wall and adapted to axially abut said kingpin on one side of said undercut, a second locking pin extending through said main body between said upper and lower wall and adapted to axially abut said kingpin on another side of said undercut, said first and second locking pins being spaced apart nearer than said major diameter to locate and retain said kingpin within said kingpin aperture.

13. The adapter of claim 12, wherein said upper wall having a fence extending perpendicularly to said upper surface of said upper wall adapted for contacting a lateral edge of said skid plate.

14. The adapter of claim 13, wherein said fence is slidably fixable with respect to said main body.

15. The adapter of claim 14, wherein said fence having a slotted wall portion affixed to a corresponding vertical wall portion, said slotted wall portion having an elongate aperture adapted to receive a jack screw.

16. The adapter of claim 12, wherein said fence is adjustable with respect to said upper wall and selectively lockable with respect thereto to said upper wall.

\* \* \* \* \*